United States Patent [19]
Frost

[11] Patent Number: 5,819,472
[45] Date of Patent: Oct. 13, 1998

[54] METHOD AND ARTICLE OF MANUFACTURE FOR REINFORCING CURVED SECTIONS OF HOLLOW WEATHERSTRIP MATERIAL

[75] Inventor: Richard A. Frost, Miamisburg, Ohio

[73] Assignee: Green Tokai Co., Ltd., Brookville, Ohio

[21] Appl. No.: 784,059

[22] Filed: Jan. 17, 1997

[51] Int. Cl.[6] ........................................... B32B 1/08
[52] U.S. Cl. .................. 49/498.1; 428/36.9; 428/122
[58] Field of Search ................... 49/498.1, 480.1; 428/36.9, 122; 132/226

[56] References Cited

U.S. PATENT DOCUMENTS

| | | | |
|---|---|---|---|
| 1,928,992 | 10/1933 | Clark et al. | 49/498.1 |
| 2,910,209 | 10/1959 | Nelson | 49/498.1 |
| 3,995,675 | 12/1976 | Cosenza | 151/69 |
| 4,335,168 | 6/1982 | Ergaver | 428/36.9 |
| 4,975,007 | 12/1990 | Molina | 411/107 |
| 5,364,109 | 11/1994 | Sihon | 277/9 |
| 5,414,346 | 5/1995 | Mohan | 324/72.5 |
| 5,428,895 | 7/1995 | Sihon | 29/888.3 |
| 5,522,128 | 6/1996 | Sauve | 29/709 |
| 5,538,578 | 7/1996 | Sugawara et al. | 156/245 |

*Primary Examiner*—Alexander Thomas
*Attorney, Agent, or Firm*—Biebel & French

[57] ABSTRACT

A flexible star plug comprising a cylindrical portion having fins projecting radially outwardly therefrom for insertion into an axial extending cavity or hollow of a rubber weather strip is provided. A method of stabilizing or reinforcing the hollow weather strip comprises inserting the plug co-axially along the hollow, and twisting the plug to create a torque force on the fins as they engage the cavity walls.

10 Claims, 3 Drawing Sheets

METHOD AND ARTICLE OF MANUFACTURE FOR REINFORCING CURVED SECTIONS OF HOLLOW WEATHERSTRIP MATERIAL

BACKGROUND OF THE INVENTION

The present invention relates to an article of manufacture and a method for stabilizing and reinforcing curved sections of a hollow, rubber weather strip. More particularly, the article of manufacture relates to a flexible star plug comprising an elongated cylindrical member having fins projecting radially outwardly therefrom, for co-axial insertion along the hollow portion of a rubber weather strip.

Automotive weather strips of the type adapted to seal openings of a vehicle body are well known. Traditionally, such weather strips have been used around the windows, doors, trunks, and hoods of automobiles to protect interior portions against the elements.

Conventional weather strips are extruded from natural or synthetic rubber, typically ethylene-propylene-diene (EPDM) rubber, using extrusion methods well known in the art. The extrusion is typically cured by heating, cooled in a water bath, and cut to a desired length to form a weather strip having two opposing ends.

Often these weatherstrip materials are disposed in closed looped or curved patterns to effect proper sealing of the desired auto or truck frame or trim part. For example, in passenger cars, a closed loop weatherstrip is used as a seal between the trunk frame and trunk hood to prevent water from entering the trunk. Similar arrangements may be made to seal auto and truck motor hood areas, door frames, etc.

In these cases, and others, it is desirable to stabilize and reinforce sections of the weatherstrip to improve the sealing efficacy of the weatherstrip and to increase density in those areas in which secure mounting or anchoring of the weatherstrip to the frame or body member is difficult.

In one prior art process, a tubular plug is inserted into the desired hollow section of the weatherstrip by an elongated insertion rod. Plastic rivets or the like are punched through the weatherstrip and into the tubular plug to prevent undesirable axial movement of the plug along the hollow cavity of the weatherstrip. Insertion of the rivets is time consuming and demands manual or robotic accuracy to insert the rivets at the proper weatherstrip locations.

There is accordingly a need in the art for a method of reinforcing hollow weatherstrips and the like that eliminates the need for ancillary fastener means such as the rivets previously described.

SUMMARY OF THE INVENTION

These and other objects of the invention are met by the instant invention. Briefly, a star-like cross-sectioned plug is provided for co-axial insertion along the axially extending hollow cavity of an elongated weatherstrip. The star plug comprises an elongated cylindrical portion and a plurality of fins projecting radially outwardly from the cylindrical portion, and is made of flexible material. The star plug may have a lumen coaxial with the cylindrical portion and running the length of the plug. The method comprises inserting the star plug into the desired hollow portion of the weatherstrip material.

The invention will become further apparent from the following description, the accompanying drawings and the appended claims.

DETAILED DESCRIPTION OF THE PREFERRED EMBODIMENT

Figure 1:
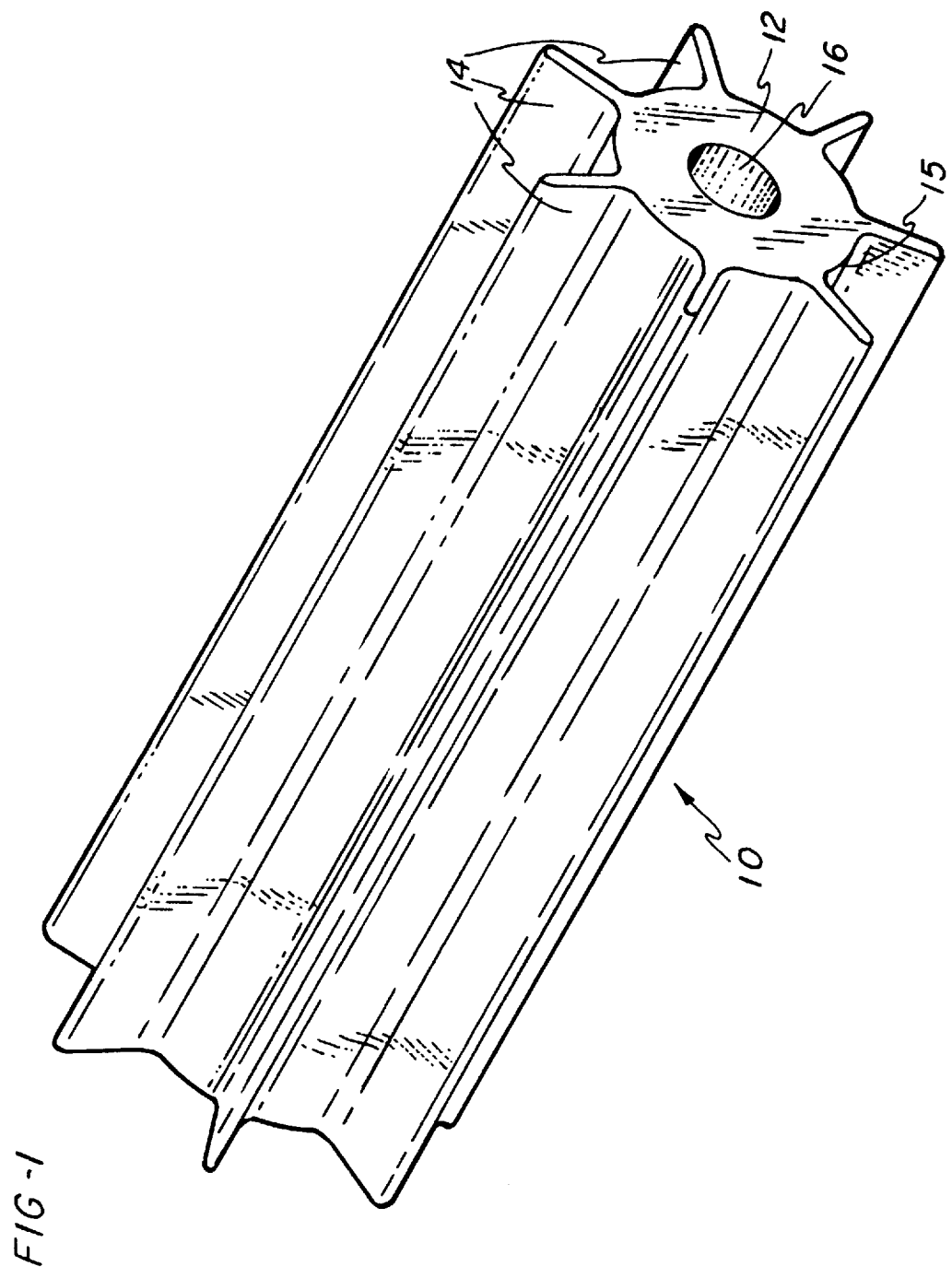
FIG. 1 is a perspective view of a star plug made in accordance with the present invention.
Figure 3:
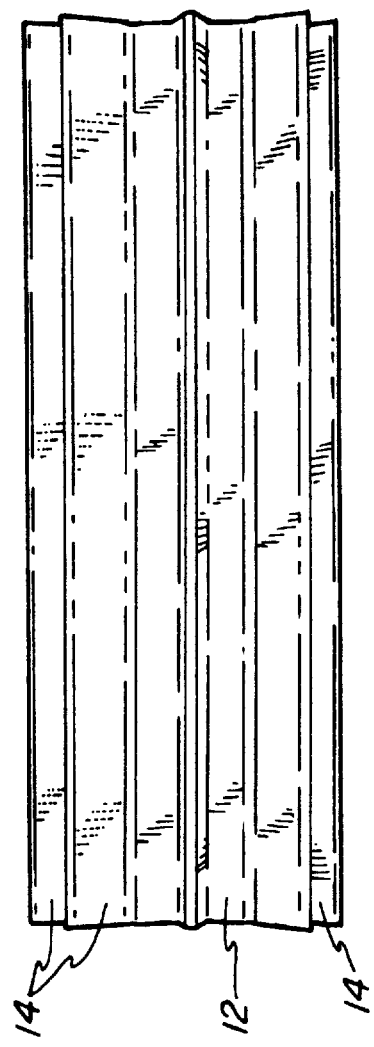
FIG. 3 is a side view of the star plug of FIG. 1.
Figure 2:
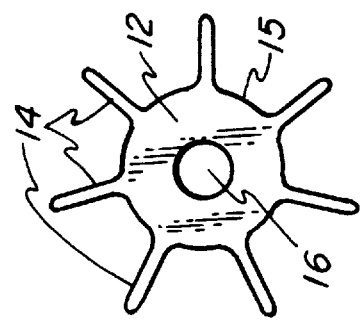
FIG. 2 is an end view of the star plug of FIG. 1.

Referring first to FIGS. 1–3, there is shown a star plug 10, in a preferred embodiment in accordance with the present invention. The star plug 10 comprises an elongated substantially cylindrical portion 12 having a root 15 and a plurality of fins 14 projecting radially outwardly from the root. Preferably, the star plug 10 includes a lumen 16 substantially coaxial with the cylindrical portion 12 and running the length of the star plug 10. As can be seen in FIG. 2, the star plug has a generally stellate cross-section, while the lumen 16 has a substantially circular cross-section. The lumen 16 may define any desired cross-section, or the lumen 16 may be omitted from the star plug 10 entirely.

The star plug 10 may be made of any sufficiently flexible material including flexible plastics, including polyvinyl chloride, and elastomeric material. Preferably, the star plug 10 is made of elastomeric material, including sponge or dense rubber. Suitable elastomeric materials include thermoset resins and thermoplastic elastomers. Most preferably, the star plug comprises a sponge EPDM rubber having a specific gravity of about 0.65. The star plug 10 is most preferably extruded, but may be made by any suitable process well know in the art.

Typically, the overall diameter of the star plug is on the order of about 5–15 mm, preferably 10 mm. The diameter of the root 15 of the plug from which the fins radially extend is about 2.5–10 mm, preferably 7.5 mm. Normally, the length of the fins:root diameter is about 0.25–0.50, with 0.33 presently preferred. The length of the star plug can of course vary depending on the lengths of the weatherstripping that need reinforcement. However, they are typically on the order of about 100–150 mm.

Figure 4:
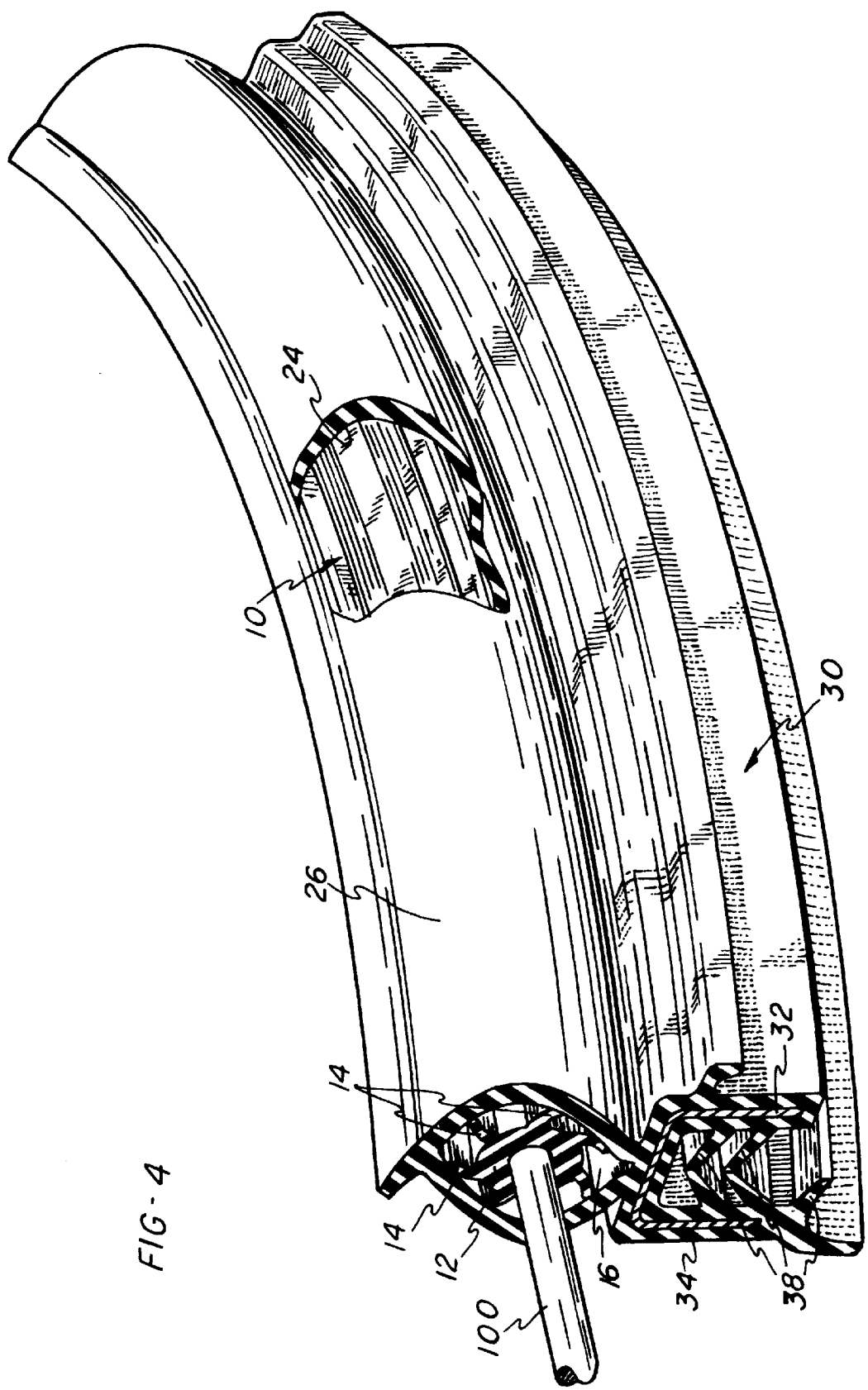
FIG. 4 is a partially cut away perspective view showing the star plug of FIG. 1 as it is co-axially inserted into the hollow cavity of the weatherstrip.

Turning now to FIG. 4, the method of stabilizing or reinforcing a section of the weatherstripping is illustrated by means of the cut away perspective view. Here, the weatherstrip comprises a sealing surface 26 shown here to be roughly in the cross-sectional configuration of an ellipse. A central axial cavity or hollow portion 24 is formed and extends along the interior of the sealing surface 26. Preferably, section 26 is formed of a compressible, spongy rubber.

The bottom or anchor section 30 of the weatherstrip comprises a metallic insert 32 and surrounding plastic or elastomer base material 34. The base comprises a plurality of gripper fins 38 that are designed for fixed attachment to a flange or rim of the requisite body or trim part therein. Accordingly, the weatherstrip can be fixedly mounted to the frame with the sealing surface 26 disposed for pressing engagement and sealing function with an auto or truck trunk lid or hood.

As shown, an elongated metal rod 100 is snugly inserted into the lumen 16 of the star plug. The star plug is then inserted into the desired axially extending hollow portion 24 of the weatherstripping for which stabilization is desired. The rod may be twisted to, in turn, torque the fins 14 and exert a compressive force extending radially from the axis of the hollow, radially outwardly onto the interior walls of the sealing section 26. This force is important in providing bulk and stability to the weatherstripping along the desired length thereof. The torque is enhanced if the o.d. of the plug is slightly larger than the diameter of the hollow 24 so that a forced friction fit of the plug in the hollow is achieved. The rod is then withdrawn, leaving the star plug in its intended position along the length of the weatherstripping.

After insertion of the star plug or plugs along the desired length of the weatherstripping, the ends of the weatherstripping may be joined together to form a continuous closed loop if desired. Conventional means for joining the ends such as molding or ultrasonic welding may be employed for this purpose.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A star plug comprising:

an elongated cylindrical portion, a plurality of fins projecting radially outwardly from the cylindrical portion, said fins being arranged substantially symmetrically about said cylindrical portion, said star plug being composed of a flexible material selected from the group consisting of plastics, natural and synthetic rubber, and a lumen coaxial with the cylindrical portion.

2. The star plug of claim 1 wherein the lumen has substantially circular cross-section.

3. Combination comprising a star plug as recited in claim 1 in combination with an elongated weatherstrip, said weatherstrip comprising an axial extending hollow cavity, said star plug coaxially mounted within said hollow cavity.

4. The star plug of claim 1 wherein each of said fins has a length approximately 0.25–0.50 of an outer diameter of said cylindrical portion.

5. A method for reinforcing a portion of an elongated weatherstrip having an axially extending hollow therein, comprising:

providing a predetermined length of a star plug including a cylindrical portion and a plurality of fins projecting radially outwardly from the cylindrical portion; and inserting the star plug coaxially along said hollow;

wherein the star plug further includes a lumen coaxial with the cylindrical portion and wherein said step of inserting comprises placing a rod in said lumen to carry said star plug, placing said rod and star plug in said hollow and removing said rod to leave said star plug in said hollow.

6. A method of stabilizing an elongated weatherstrip having an axially extending cavity surrounded by walls of a sealing member, said method comprising:

providing an elongated plug member having a root and a plurality of fin members extending outwardly from said root, co-axially inserting said plug member into said cavity twisting said plug member and torquing said fin members against said sealing member walls.

7. A method as recited in claim 6 wherein said plug member comprises a lumen axially extending through said root, said inserting comprising providing a carrier rod, placing said carrier rod into said lumen to form a frictional fit between said carrier rod and said lumen, and sliding said carrier rod and said plug into said hollow, and then removing said carrier rod.

8. The method of claim 7 wherein the lumen has a substantially circular cross-section.

9. A reinforced elongated weatherstrip comprising:

an anchor section;

a compressible sealing section mounted on said anchor section, said sealing section including an enclosed hollow cavity defining interior walls of said sealing section; and a star plug positioned in said hollow cavity, said star plug including an elongated cylindrical portion and a plurality of fins projecting radially outwardly from said cylindrical portion for exerting a compressive force radially outwardly onto said interior walls of said hollow cavity.

10. The reinforced elongated weatherstrip of claim 9 wherein said star plug has an outer diameter larger than an inner diameter of said hollow cavity.

* * * * *